Patented Jan. 13, 1953

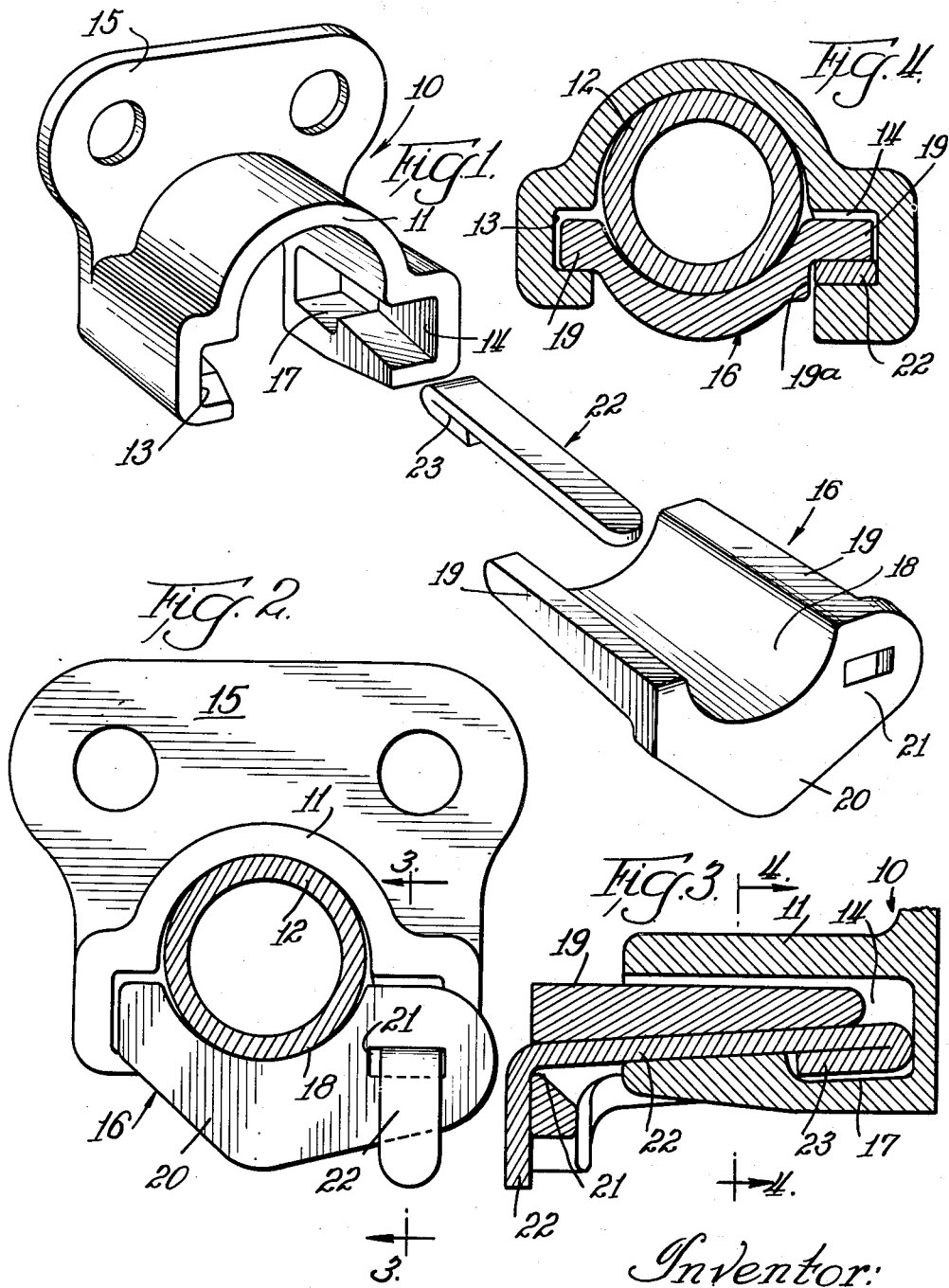

2,625,354

UNITED STATES PATENT OFFICE 2,625,354

PIPE SUPPORTING AND ANCHORING MEANS

Edward Payson Smith, Winnetka, Ill., assignor to Illinois Railway Equipment Company, Chicago, Ill., a corporation of Illinois Application September 6, 1950, Serial No. 183,307

4 Claims. (Cl. 248—58)

My invention relates more especially to means for supporting and anchoring the air lines or pipes of the air brake system beneath a railroad car, namely, to the car underframe; the invention having for its object the provision of simple means for securely holding the pipe against vibration and displacement and which consists of a lesser number of parts than in anchors heretofore employed and hence an anchor which may be more cheaply made and installed and involving less maintenance cost.

My invention also has for its object the provision of an anchor comprising a pipe-receiving body member, a pipe-clamping or wedge member adapted to have interengaging and wedge relation with the body member and a wedge locking key, hence a streamlined pipe anchor which eliminates the use of bolts and nuts and the protrusion of breakable or bendable parts; an anchor which may more quickly be applied and more easily released from pipe clamping condition.

The above mentioned objects and advantages will be readily comprehended from the detailed description of the accompanying drawing wherein:

Figure 1 is an exploded view of my improved means, with the respective elements shown in perspective.

Figure 2 is a front elevation of the anchor means with a section of pipe in place.

Figure 3 is a sectional view taken substantially on the line 3—3 of Figure 2, looking in the direction of the arrows.

Figure 4 is a cross-sectional view taken on the line 4—4 of Figure 3, looking in the direction of the arrows.

In the exemplification of my invention, the base member 10 is provided with a semi-cylindrical body portion 11 adapted to straddle or receive the pipe to be anchored as shown in Figure 2, where a section of a pipe is shown at 12.

The sides of the semi-cylindrical body portion 11 are laterally disposed and enlarged vertically to receive the longitudinally disposed grooves 13, 14, extending from front to rear as shown in Figure 1; and the rear or attaching end of the anchor body 11 is shown provided with a right angularly disposed flange 15 whereby the anchor may be bolted, riveted, or otherwise rigidly secured to the car underframe.

The groove 13 may extend entirely through to the attaching end of the anchor, while the groove 14 preferably terminates short of the rear wall of the anchor as shown in Figure 1.

The lower walls of the grooves 13, 14, preferably incline upwardly toward the inner or rear ends to induce a firm gripping engagement of the wedge member 16 with the pipe 12 when the wedge member 16 is driven into place, as in Figures 2 and 4.

The inner rear end of groove 14 is provided with a socket 17 with a straight, forward wall and the socket is of prearranged length for purposes hereinafter described.

The wedge member 16 also is formed with a substantially semi-cylindrical channel 18 to fit about the under or opposite side of the pipe as seen in Figure 2; while the opposite longitudinal edges are somewhat enlarged, extended laterally and provided with plane surfaces as shown at 19, to extend into and to slide in the grooves 13, 14, in the body member 10.

The enlarged side flanges or sides 19 preferably decrease in vertical thickness toward the inner end of the wedge member to match the incline of the lower walls of the grooves 13, 14, thereby causing the wedge member 16 to effect firmer gripping relation with the pipe. The flange 19 which enters groove 14 is formed to provide a right angular shoulder 19a to provide an abutment or stop adjacent groove 14 for purposes hereinafter described.

The forward end of the wedge member 16 is enlarged to provide the vertical, striking flange 20, at the outer end of the wedge member 16, and this flange 20 at one side, and aligned with the outer end of groove 14 of the body member 10, is provided with a suitable opening or slot 21, which communicates with the groove 14 beneath the side flange 19 at one side of the wedge member 16.

The groove 14 and its rear socket 17 are intended to receive the wedge locking member 22, shown in Figure 1 intermediate the main body or anchor member 10 and the flange 19 of the wedge member 16. The lock member 22 preferably consists of an elongated narrow strip of ductile metal so as to lie wholly within the groove 14 and its outer end passed through the slot or opening 21 in the forward or outer end flange 20 of wedge member 16 as shown in Figures 2 and 3.

The inner end of the locking strip 22 is enlarged by bending the strip end back upon itself as shown at 23; and this enlarged inner end of the strip 22 seats in the socket 17 at the inner end of groove 14 in the body member 10. The bent end of the strip 22 is formed to provide a flat surface adapted to engage the plane forward end wall of the socket 17; and the locking strip is held in the groove by the shoulder 19a on the wedge member 16.

In assembling, the body member 10 is placed in straddling relation on the pipe 12 and securely fastened to the car underframe; the lock member 22 is then inserted in the groove 14 with the enlarged or folded back portion 23 of member 22 facing downwardly in the socket 17. The locking strip 22 is of length sufficient to extend beyond the forward or free end of the body member 10 and to extend sufficiently beyond the outer end of the wedge member 16 after the latter has been driven into place.

The wedge member 16 is applied with its concaved side disposed about the lower side of the pipe 12 and its side flanges 19 slidably arranged in the grooves 13, 14, of the body member. The wedge member 16 is then forced or driven into the body member 10, with the free outer end of lock strip 22 protruding through the slot or opening 21 in the flange 20 of the wedge member.

By reason of the oppositely sloping surfaces in the grooves 13, 14, and on the side flanges 19, 19, of the member 16, the latter effects a very tight wedging relation with the pipe, increasing in degree as the wedge member 16 is driven into place. After the wedge member has reached the limit of its telescopic movement, the protruding end of the locking member or strip 22 is then, by means of a hammer blow, bent downwardly as shown in Figures 2 and 3, thereby firmly securing wedge member 16 in pipe clamping position against any releasing movement.

As is apparent from the drawing, sidewise movement or displacement of the lock strip out of the groove 14 is impossible by reason of the shoulder 19a when the pipe 12 is seated in the channel of the body member 10; while outward movement of lock strip 22 is prevented by the under-bent or enlarged end of the strip abutting the forward wall of the socket 17. Lock strip 22 is made of sufficient length to protrude through slot 21 as soon as wedge member 16 is driven into pipe clamping position. In order to release the pipe it is merely necessary to somewhat straighten the bent end of lock strip 22, which permits the wedge member 16 to be removed, thus eliminating difficulties encountered and labor required with structures employing bolts and nuts for fastening the wedge members of pipe clamps, resulting from the bolts and nuts corroding and becoming "frozen" which frequently necessitated cutting or burning off the bolts and making further use impossible.

My improved pipe anchor not only is easily and securely applied but as quickly and easily released without need for replacement.

Providing the base member or a groove therein and the lock strip or member with off-set interengaging surfaces a very effective and easily manipulated pipe anchor is provided which requires no special tools and while the structure shown and described is believed to be the best exemplification, certain structural modifications are possible and may be made without, however, departing from the spirit of my invention.

What I claim is:

1. Pipe supporting and anchoring means comprising a main body member with an apertured attaching flange and formed to provide a substantially semi-cylindrical pipe receiving channel from end to end, with the longitudinal sides disposed laterally and downwardly to receive longitudinal grooves on their inner faces with the lower surfaces of said grooves sloping inwardly upward and one of said grooves at its rear or inner end and in the lower surface provided with a straight walled longitudinally disposed recess below the plane of the sloping surface; a pipe wedge member provided with plain surfaced longitudinal edges matching the sloping grooves in said body member and to slide therein, the outer end of the wedge member having a flange provided with a slot or opening adapted to align with the recessed groove in the body member; and an elongated bendable lock strip of length greater than the length of the recessed groove in the body member and provided with an enlargement at the inner end adapted to seat in said recess beneath the plane of the sloping surface of the groove while the outer end of the strip extends through said opening in the wedge member flange and is adapted to be bent against the outer end of the wedge member and thereby lock the latter in pipe clamping condition.

2. Pipe supporting and anchoring means comprising a longitudinally channeled body member adapted to straddle a pipe and having side walls whose inner faces are provided with longitudinal grooves having bottom walls sloping upwardly toward the inner ends, one of the grooves at its inner end having a recess in its bottom with a vertical wall at its forward end of the recess; a wedge member having side edges tapering toward the inner end adapted to slide in said grooves and effect pipe clamping condition, the wedge member adjacent the side edge which slides into the body member groove with the recess having a longitudinal shoulder, the outer end wall of said wedge member having an opening therethrough; and an elongated bendable strip arranged lengthwise in the last mentioned groove in the body member, the inner end of said strip being formed with an off-set head adapted to seat in said recess and to hold the strip against longitudinal movement and its lateral displacement prevented by the shoulder on the wedge member, while the outer end of the strip extends through said opening in the wedge member end wall to permit downward bending and thereby lock the wedge member in place.

3. Pipe supporting and anchoring means comprising a longitudinally channeled body member formed to straddle the pipe and provided on its inner side with a pair of longitudinal grooves having lower surfaces tapering upward toward their inner ends, at least one of said grooves being of greater vertical depth and having an off-set portion below its upper surface; a wedge member formed to fit about the lower side of the pipe and having tapering side flanges slidable in the grooves of the main member; and a bendable locking member with an off-set portion at its inner end adapted to seat in said groove off-set to hold the locking member against longitudinal movement, said member being adapted to extend lengthwise of the groove, while the outer end of said locking member is bendable across the outer end of said wedge member to hold the latter against longitudinal movement.

4. Pipe supporting and anchoring means comprising a longitudinally channeled body member, having an apertured attaching flange at one end, formed to straddle a pipe and provided on its inner side walls with a pair of longitudinal grooves with bottom surfaces sloping upwardly toward their inner ends and one of the grooves being of greater depth; a wedge member having side edges formed to slide in said grooves; and an elongated locking member for said wedge member adapted to seat in the last mentioned groove to extend parallel with a wedge member side edge and to extend beyond the outer end thereof and in conjunction with the groove effect pipe wedging action of the wedge member, said groove and locking member at its inner end having interengaging surfaces whereby longitudinal movement of the locking member is prevented, while the outer end of the locking member is bendable across the outer end of the wedge member to thereby lock the latter against longitudinal movement.

EDWARD PAYSON SMITH.

REFERENCES CITED

The following references are of record in the file of this patent:

UNITED STATES PATENTS

| Number | Name | Date |
|---|---|---|
| 1,434,433 | Ettinger | Nov. 7, 1922 |
| 1,672,601 | Brent | June 5, 1928 |
| 1,821,295 | Dieter | Sept. 11, 1931 |
| 2,546,792 | Smith et al. | Mar. 27, 1951 |